United States Patent Office 2,796,443
Patented June 18, 1957

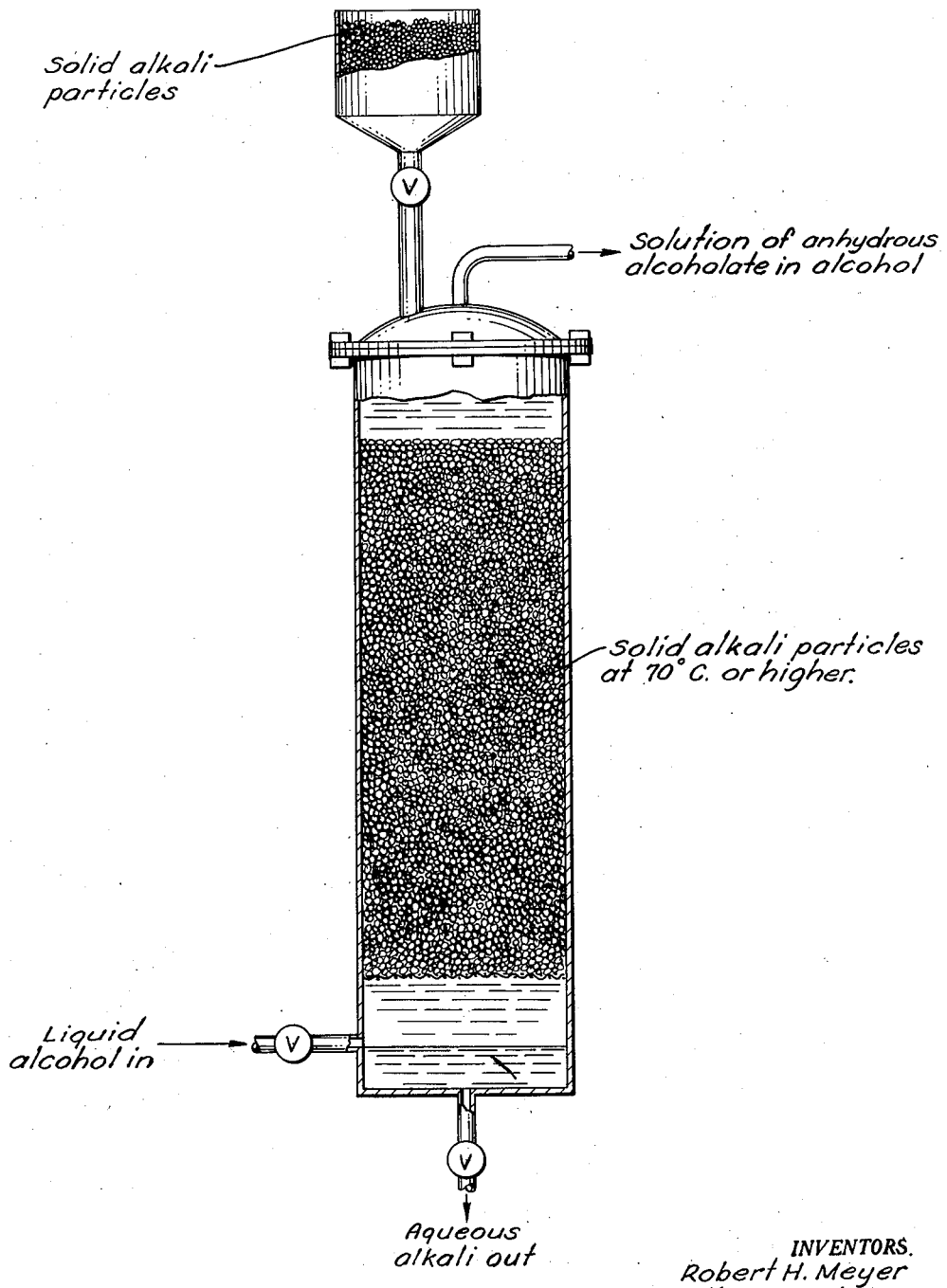

2,796,443

METHOD FOR MAKING ANHYDROUS ALKALI METAL ALCOHOLATES

Robert H. Meyer and Arthur K. Johnson, Concord, Calif., assignors to The Dow Chemical Company, Midland, Mich., a corporation of Delaware Application March 12, 1956, Serial No. 571,034

7 Claims. (Cl. 260—618)

This invention relates to the preparation of alkali metal alcoholates and particularly to a process for the preparation of anhydrous alkali metal alcoholates substantially free of excess alkali.

This application is a continuation-in-part of copending U. S. application Serial No. 354,710, dated May 13, 1953, now abandoned.

Alkali metal alcoholates have been made by reacting alkali metals with anhydrous alcohols. However, the cost of materials and the dangers involved in handling such materials generally preclude the commercial use of that method. In other processes, alcohols are caused to react with alkali metal hydroxides according to the equation:

(1) $ROH + MOH \rightleftharpoons ROM + HOH$ 

wherein ROH represents an alcohol and MOH represents an alkali metal hydroxide, usually sodium or potassium hydroxide. In such methods it is necessary to remove the water formed during the reaction to force the equilibrium to the right and to obtain anhydrous alcoholates. The methods employed in the past for removing the water have used an excess of alcohol or a diluent that forms an azeotrope with water or with water and the alcohol subsequently distilling the alcoholate solution to recover the anhydrous alcoholate. The complete removal of water by those methods is very difficult and necessitates a great expenditure of heat and carefully controlled fractionation equipment. Still another method passes alcohol vapors through an alcoholic solution of an alkali metal hydroxide with or without an auxiliary liquid capable of forming an azeotrope with water. The alcoholate settles to the bottom of the reaction vessel and the azeotrope is taken off the top. That method is primarily suitable for the lower boiling alcohols.

It would be desirable to have, and it is the principal object of this invention to provide, a process for preparing anhydrous alcohol solutions of alkali metal alcoholates and anhydrous alkali metal alcoholates recoverable from such solutions simply and economically.

It is a further object to provide a process which can be used for preparing alkali metal alcoholates from a greater number of liquid monohydric alcohols than has heretofore been possible.

It is a still further object to provide such a process which may be operated continuously.

The above and related objects are accomplished by the process illustrated diagrammatically in the accompanying flow sheet. In this process a heated liquid alcohol is passed upward in a column through a molar excess of solid alkali metal hydroxide, preferably sodium or potassium hydroxide, and caused to react. The alcoholate dissolves in the alcohol and is carried upward in the alcohol solution where the solution may be drawn off and the anhydrous alcoholate isolated by simple distillation or evaporation of the solution. The water formed in the reaction of alcohol and hydroxide is absorbed by and finally dissolves the excess alkali metal hydroxide and the resulting strong aqueous alkali solution passes downwardly by gravity countercurrently to the rising alcohol solution of alcoholate to the lower portion of the column where it is drawn off. A hopper is provided at the top of the column to add fresh alkali metal hydroxide if desired.

As alcohols there may be used aliphatic alcohols with two or more carbon atoms, cycloaliphatic alcohols, and aryl aliphatic alcohols, such as benzyl alcohol. Alcohols which are immiscible with the water formed are preferred, though certain water miscible alcohols, such as ethanol will work. Alcohols containing substituents other than hydroxyl may also be used, if they are stable in the presence of alkali at the temperatures employed. With alcohols containing more than eighteen carbon atoms the reaction is usually so slow as to be uneconomical.

The alkali metal hydroxide used must be in excess of the stoichiometric amount required in Equation 1. One mole of alkali per mole of alcoholic hydroxyl must be used, and, in addition, sufficient alkali to remove the water of the reaction must be present. This has been found to require from 0.1 to 0.4 mole of alkali in addition to the stoichiometric amount. Larger amounts of caustic may be used when it is desired to carry out long continuous runs.

This process involves a moving particulate alkali metal hydroxide bed. Because at the lower end of the column or bed the reaction equilibrium is to the left a greater amount of reaction occurs in that zone and because the downwardly flowing aqueous stream dissolves more hydroxide, a greater amount of hydroxide is used up in a given length of time than in the upper regions. If the hydroxide bed were not moved and the hydroxide supply replenished, the lower end of the bed and the initial plane of reaction would move upwardly relative to the stationary reaction tower and the total amount of hydroxide available for contact with alcohol would in time diminish. As previously mentioned the amount of hydroxide must not fall below a minimum molar excess of 0.1 hydroxide for the process to produce anhydrous alcoholate.

When the hydroxide falls below such an excess a corresponding diminution of alcoholate in the effluent occurs and water of reaction from a lower zone being carried upward in the alcohol solution cannot be removed, resulting in alcoholate solutions which are not anhydrous.

Two courses of action are possible. In short batch runs a predetermined amount of alcohol may be passed once through a precalculated excess of alkali metal hydroxide. Following that reaction the tower may be repacked with hydroxide and a second-pass made. In long batch runs and in continuous runs the bed of hydroxide and thus the contact time of alcohol and hydroxide may be kept constant by adding fresh hydroxide to the top of the bed through a hopper either continuously or intermittently. In such a method the bed of hydroxide can rest upon a screen or perfortaed plate so that the bottom of the hydroxide bed can remain at the same relative position in the tower through gravity forcing the bed down as hydroxide is consumed. Alternatively, the bed can be moved mechanically by placing the bed in a support capable of reciprocal movement within the tower. As the hydroxide is consumed the bed can be mechanically moved to maintain its relative position.

The reaction rate increases with increasing temperatures. The lowest temperature which is practical to use is 70° C. Below 70° C. the reaction proceeds too slowly to make the process economical. The maximum temperature is limited by the boiling point of the alcohol or by the temperature at which the alcoholate decomposes, whichever temperature is the lower. It is necessary that the reaction be carried out in the liquid phase. Even when treating alcohols which boil above 200° C., no advantage is found in carrying out the reaction above that temperature, and the solutions become so concentrated and viscous as to be difficult to handle.

In operation the reaction equilibrium will be progressively shifted throughout the column. As the alcohol contacts the lower end of the hydroxide column it will encounter a relatively low concentration of hydroxide in aqueous solution. The production of water from the reaction and the water present from the downwardly flowing aqueous hydroxide solution result in considerable water being present in the alcohol solution in the lower regions of the column. As the alcoholic solution rises, this water is removed from that solution by the hydroxide and the resulting aqueous hydroxide solution joins the already present downwardly flowing aqueous solution. In consequence as the alcohol rises the concentration of hydroxide relative to water will be increased until near the top essentially anhydrous hydroxide is present. Additionally as the alcohol rises, the concentration of alcoholate in alcoholic solution increases. Thus, near the top the conditions are such that an essentially anhydrous alcoholate solution in alcohol is in contact with an essentially anhydrous hydroxide. It was unexpected and could not have been predicted that under such conditions anhydrous alcoholate solutions would result, since the prior teachings would indicate that under such conditions more alcoholate and consequently more water should be produced until the hydroxide was no longer present and that the effluent should contain some water. However, this process results in anhydrous alcoholic solutions of alkali metal alcoholates from which the alcoholates may be isolated by simple conventional distillation and evaporation methods.

This process may be operated using any rates of flow within practical limitations. Those limitations will be determined by the amount of alcoholate desired, the size of equipment, pumping capacity and other similar conditions. However, for any given alcohol the yield of alcoholate may be varied by changing the operating conditions, such as rate of flow of alcohol and more particularly the temperature of the reaction. By proper adjustment of operating conditions a saturated solution of alcoholate in alcohol may be realized and this would represent a maximum yield.

By the method of this invention, the water formed in reaction 1 is continuously removed, forcing the equilibrium to the right. By continuously removing the water in this manner a more economical process for producing anhydrous alcoholates is obtained.

Example 1

A glass column 1 inch in diameter and 3 feet long, one-third filled with 8 mm. glass rings was filled with pellet KOH (85%). 3-pentanol was fed into the bottom of the column at a rate of approximately 5 cc./min. The column was held at 120° C. A representative sample of the effluent from the top of the column analyzed 40.0% anhydrous alcoholate and 2.4% dissolved KOH. A sample of the aqueous layer from the bottom of the column analyzed 54.0% KOH.

Example 2

A run was made by the method described in Example 1 using ethanol in place of 3-pentanol. The column was kept at 68° C. and a sample of the effluent from the top of the column analyzed 30.4% anhydrous alcoholate.

Example 3

Example 2 was repeated using 2-propanol in place of ethanol. The column temperature was 90° C. and a sample of the effluent from the top of the column analyzed 19.4% anhydrous alcoholate.

Example 4

The method of Example 2 was again repeated using diethylaminoethanol in place of ethanol. The column temperature was 120° C. and a sample of the effluent from the top of the column analyzed 43 percent anhydrous alcoholate.

Example 5

Benzyl alcohol was treated in the same manner. The column temperature was 120° C. and the effluent from the top of the column analyzed 17 percent anhydrous alcoholate.

Example 6

To test the effectiveness of the method of the invention with high boiling alcohols, the method of Example 2 was repeated using dipropylene glycol monophenyl ether in place of ethanol. The alkali was sodium hydroxide. The column was held at 120° C. and the effluent from the top of the column analyzed 30 percent alcoholate.

Example 7

Tetrapropylene glycol monoethyl ether was subjected to the described treatment over sodium hydroxide at 120° C., and a 15 percent solution of its alcoholate was obtained.

Example 8

2-butanol was passed upward through a bed of solid potassium hydroxide at 90° C. in like manner, and the recovered solution contained 15.1 percent of the anhydrous alcoholate.

Little or no alcoholate is obtained when the process is attempted with dihydric alcohols, or when using lithium hydroxide with the monohydric alcohols.

We claim:

1. A process for making anhydrous alcoholic solutions of alkali metal alcoholates from which said alcoholate may be easily isolated which comprises forcing a liquid monohydric alcohol containing at least 2 carbon atoms to rise through a bed of solid particles of one of the alkalies sodium hydroxide and potassium hydroxide at a temperature between 70° and 200° C. at which the alcohol is liquid, and recovering an alcohol solution of the anhydrous alkali metal alcoholate overhead, while drawing off concentrated aqueous alkali metal hydroxide from beneath the said bed, and maintaining the said bed at substantially constant volume by addition of solid alkali to replace that which is consumed and withdrawn.

2. The process claimed in claim 1, wherein the alcohol is an aliphatic alcohol having from 2 to 18 carbon atoms.

3. The process claimed in claim 1, wherein the alcohol is ethanol.

4. The process claimed in claim 1, wherein the alcohol is 3-pentanol.

5. The process claimed in claim 1, wherein the alcohol is 2-butanol.

6. The process claimed in claim 1, wherein the alcohol is 2-propanol.

7. The process claimed in claim 1, wherein the alcohol is benzyl alcohol.

No references cited.